US005942988A

United States Patent [19]

Snyder et al.

[11] Patent Number: 5,942,988

[45] Date of Patent: *Aug. 24, 1999

[54] REMOTE ENGINE STARTER WITH ENGINE CUTOFF

[75] Inventors: Douglas D. Snyder, Bergholz; James J. Sawinski, Bridgeport, both of Ohio

[73] Assignee: Bulldog Security Alarm Systems, Wintersville, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,768

[22] Filed: Sep. 15, 1995

[51] Int. Cl.$^{6}$ ...................................................... H04Q 1/00

[52] U.S. Cl. .................. 340/825.69; 341/176; 307/10.1; 180/167; 180/287; 123/179.4

[58] Field of Search ......................... 340/825.31, 825.34, 340/825.69, 825.72, 426; 123/179.5, 179.4; 180/287, 167; 307/10.1; 341/176; 364/424.05

[56] References Cited

U.S. PATENT DOCUMENTS

| | | | |
|---|---|---|---|
| 4,227,588 | 10/1980 | Biancardi | 180/167 |
| 4,656,363 | 4/1987 | Carter | 307/10.1 |
| 4,674,454 | 6/1987 | Phairr | 180/167 |
| 4,733,638 | 3/1988 | Anderson | 180/287 |
| 4,893,240 | 1/1990 | Karkouti | 341/176 |
| 4,928,778 | 5/1990 | Tin | 180/287 |
| 4,975,678 | 12/1990 | Hwang | 340/426 |
| 5,042,439 | 8/1991 | Tholl | 180/167 |
| 5,054,569 | 10/1991 | Scott | 341/176 |
| 5,461,382 | 10/1995 | Deguchi | 341/176 |
| 5,534,845 | 7/1996 | Issa | 340/426 |

*Primary Examiner*—Brian Zimmerman
*Attorney, Agent, or Firm*—Morris, Manning & Martin, L.L.P.

[57] ABSTRACT

The remote starter includes a receiver for receiving wireless signals and a controller coupled to the receiver and the engine ignition. The controller activates the ignition in response to receipt of an engine start signal by the receiver and terminates the operation of the engine upon detection of a predetermined condition. The remote engine starter of the present invention may be used to start a vehicle engine and environmentally condition the vehicle interior without indefinitely operating the vehicle. Preferably, the controller terminates engine operation after a predetermined time. The predetermined time period is preferably selected by a user through a remote transmitter. In response to the time period selection, the controller generates a confirmation signal which indicates the selected time period. The preferred embodiment also includes a brake pedal sensor which generates a signal indicative of depression of the brake pedal and a hood open sensor for generating a signal indicative of an opening of the hood. In response to signal from these sensors, the controller terminates engine operation, if the engine is running, or does not start the engine if a start engine signal is received while either of these conditions is indicated.

3 Claims, 7 Drawing Sheets

REMOTE ENGINE STARTER WITH ENGINE CUTOFF

FIELD OF THE INVENTION

This invention generally relates to remote vehicle engine starters and, more particularly, to wireless signal remote engine starters.

BACKGROUND OF THE INVENTION

Wireless devices for remotely starting an automobile engine typically include a receiver for receiving radio frequency encoded signals and an electronic controller coupled to a vehicle ignition which starts an engine in response to the receiver receiving a wireless signal. The remote transmitter used to activate such devices usually sends a radio signal encoded with an identification code so the receiver may verify the transmitter is authorized to start the vehicle engine. If it is authorized, the controller activates the ignition to start the engine. The operating engine may be used to environmentally condition the car before the driver arrives to enter the car. After the driver enters the car, the ignition key is placed in the ignition switch and turned on. The vehicle may then be operated as if the driver had started the car with the key.

While the remote starting of the engine is useful, especially at times when environmental conditions are extreme, there are some limitations to previously known devices. For example, after the engine is started remotely, the driver may be distracted and forget the engine is operating. As the engine continues to run, it consumes fuel, even though the interior of the vehicle has reached a comfortable level. As a result, fuel may be unnecessarily consumed.

Another limitation of such devices is the inability to selectively disable the remote starter. Previously known remote starters are coupled to the vehicle power and starter wires to engage the starter and then operate the car once the engine is started. These systems remain coupled to the wires and are capable of starting the engine at any time. Thus, the vehicle may be accidentally started by the inadvertent transmission of a wireless signal at inappropriate times. For example, if the vehicle is being serviced when such a signal is received, there may be some risk of injury to service personnel when the engine starts.

What is needed is a remote engine starter that reduces the likelihood of unnecessary fuel consumption. What is needed is a remote engine starter that may be selectively disabled for servicing of the vehicle or the like.

SUMMARY OF THE INVENTION

In accordance with the principles of the present invention, a remote engine starter is provided which starts and stops a vehicle engine. The remote starter includes a receiver for receiving a wireless encoded signal and a controller coupled to the receiver and engine ignition so that the controller activates the ignition in response to a start signal received by said receiver and deactivates the engine upon detection of a predetermined condition. Thus, the engine may be remotely started to environmentally condition the vehicle and then stopped to conserve fuel and reduce engine wear.

In a preferred embodiment of the present invention, the predetermined condition which causes the controller to stop the engine is the expiration of a time period. The controller preferably initiates timing of the time period in response to detecting the starting of the engine. At the expiration of the time period, the controller deactivates the engine by, preferably, terminating power to the ignition circuits of engine. Preferably, the time period is selectively set by a user to a predetermined value. To confirm receipt of the start engine signal, the controller generates a confirmation signal, such as flashing the parking lights. After the engine is started, the controller generates an engine operating signal by, for example, turning on the parking lights. In this way, the driver knows the engine will operate for the predetermined time. Additionally, the lights enable the driver to inspect the vehicle interior prior to entering the car.

In a most preferred embodiment, the remote engine starter includes a brake pedal sensor and a hood sensor. These sensors are coupled to the controller to provide a signal indicative of the depression of the brake pedal and the opening of the hood. In response to the brake pedal signal, the controller terminates power to the engine and starter if an ignition key has not been used to turn on the ignition switch. In this way, anyone attempting to drive the car away after it has been started, without using a key to turn on the ignition switch, stops the engine. Likewise, anyone opening the hood decouples the controller from the engine starter which reduces the likelihood that an inadvertent signal transmission would start the engine while the hood is open. These and other advantages and objects of the present invention may be discerned by reading the detailed description in conjunction with the accompanying drawings.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
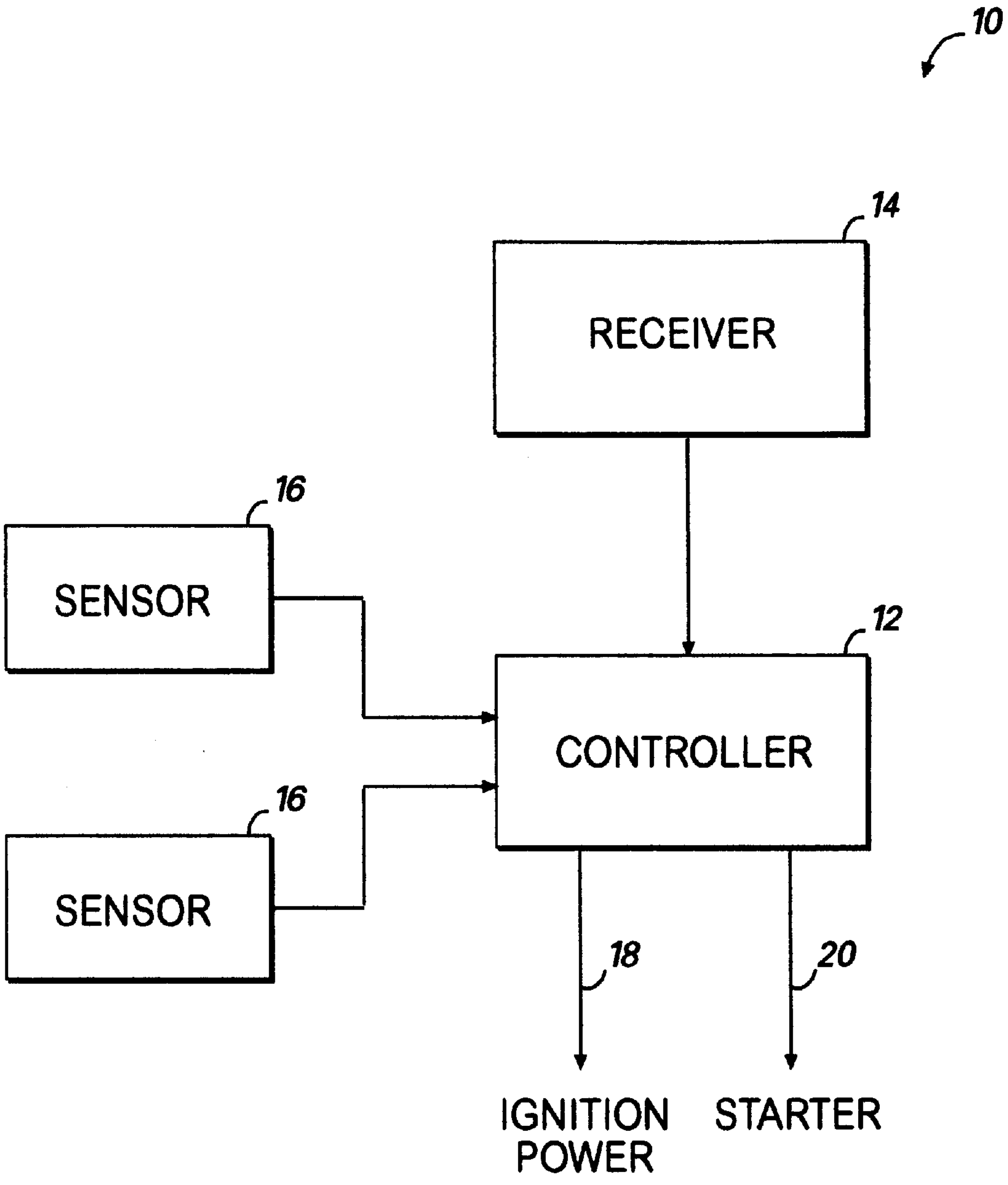
FIG. 1 is a block diagram of an embodiment of remote engine starter made according to the principles of the present invention.

FIG. 1 is a block diagram of an embodiment of the remote vehicle starter 10 of the present invention. Remote starter 10 includes a controller 12 which is coupled to a receiver 14 and sensors 16. Receiver 14 receives wireless signals typically generated by a radio frequency (RF) transmitter. Preferably, the signals sent to the receiver 14 are encoded so receiver 14 decodes only signals from a transmitter having a predetermined identification code. The decoded signal is provided to controller 12. Controller 12 determines the type of signal received and performs a corresponding control action. When the signal is a START ENGINE signal, controller 12 activates the ignition power output 18 and the starter output 20 which provides power to the vehicle ignition system and its starter, respectively. After the engine is started, controller 12 preferably senses engine speed and deactivates starter output 20 in response to the engine speed indicating the engine has started. Ignition power output 18 remains activated so the engine continues to run. Sensors 16 generate signals indicating that predetermined conditions have occurred. When controller 12 detects a signal from one of the sensors 16, controller 12 deactivates ignition power output 18 which stops the engine.

Controller 12 is preferably a microprocessor or microcontroller with volatile and non-volatile data storage powered by the vehicle battery and possibly a back-up battery. A minimum embodiment of controller 12 includes a microprocessor or a microcontroller, random access memory (RAM), and storage for a program defining the operations performed by controller 12. The program may be stored in read only memory (ROM), or in electrically programmable read only memory (EPROM or EEPROM).

Figure 2:
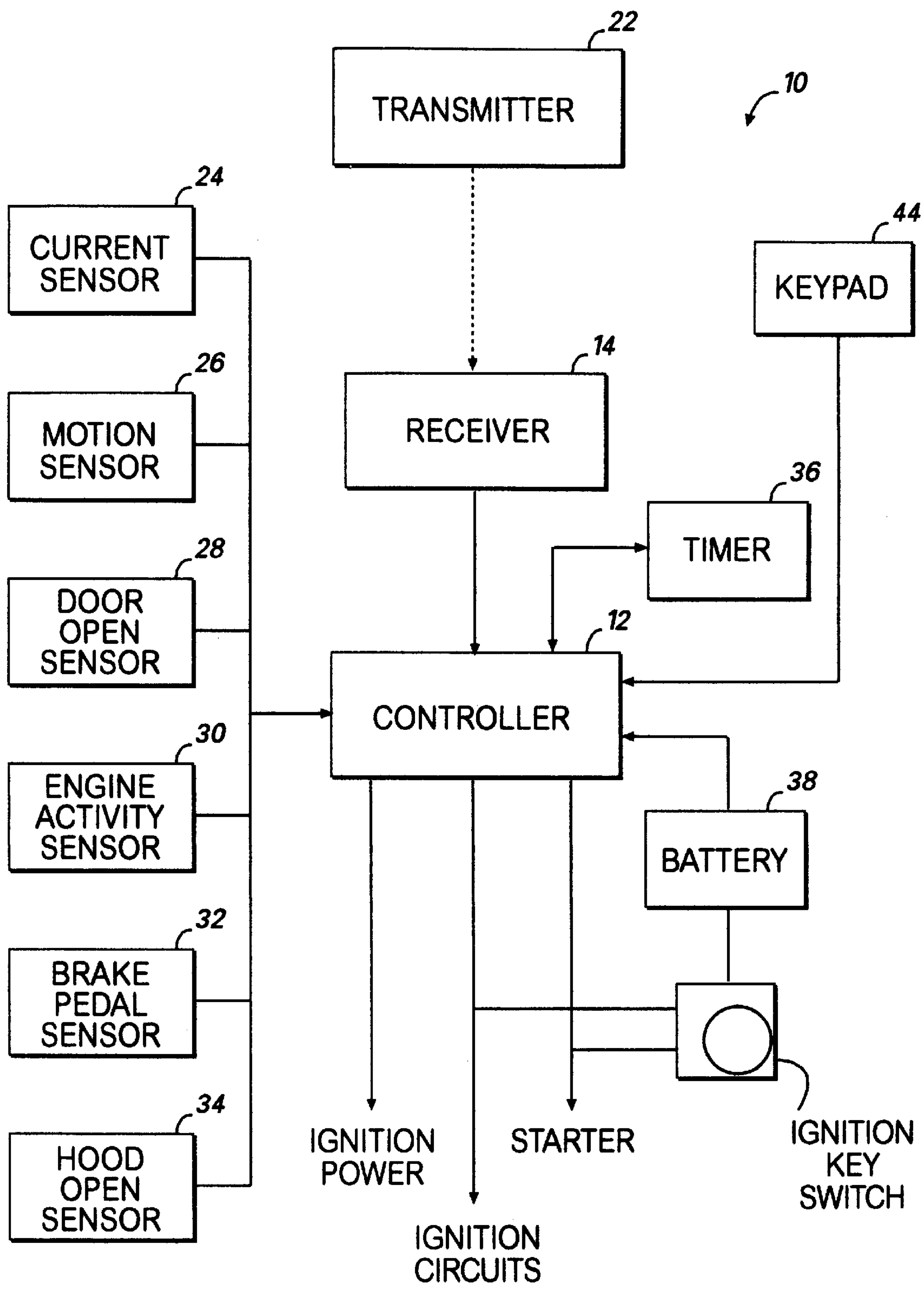
FIG. 2 is a block diagram of a preferred embodiment of a remote engine starter.

A preferred embodiment of remote vehicle starter 10' is shown in FIG. 2. The user of starter 10' preferably and primarily controls remote starter 10' through a portable RF transmitter 22. Controller 12 may also receive control signals through a keypad or switch 44. To prevent starter 10' from responding to unauthorized transmitters, transmitter 22 preferably emits signals on a specific radio frequency and includes an identification code to identify the source of the signal. Receiver 14 receives the signal if it is to need to receive the transmitter frequency and demodulates the information from it. If the identification code from the signal matches a code stored in receiver 14, the remaining information decoded from the signal is provided to controller 12.

Controller 12 is coupled to a variety of sensors such as current sensor 24 which detects current flow in the vehicle's electrical systems, motion sensor 26 which detects vibrations in the vehicle and movement in an area around and within the vehicle, door open sensor 28 which detects an opening of a door, engine activity sensor 30 which detects engine sounds or electromagnetic interference radiation generated by an operating engine, brake pedal sensor 32 which detects depression of the brake pedal, and hood open sensor 34 which detects an opening of the hood. The sensors shown in FIG. 2 are exemplary only and other sensors or combinations of sensors may be used. All of the sensors coupled to controller 12 generate a sensor signal in response to a detected condition such as the exemplary ones noted above. In response to a sensor signal, controller 12 may determine that a control action such as ignition power or starter activation is required. Controller 12 may also be coupled to one or more of the vehicle lighting systems to provide confirmation and acknowledgment signals to a user operating transmitter 22. Power for remote starter 10' and its outputs to the ignition circuits and starter are derived from the vehicle battery 38. During engine operation, power may alternatively be drawn from a generator driven by the engine.

Starter 10' may also include a timer for timing a time period and generating a time expiration signal in response to expiration of the time period. The timer may be implemented in software within controller 12 using known methods or it may be an external hardware timer 36 coupled to controller 12. Either implementation of the timer may be used for timing any time period required by controller 12.

Figure 3:
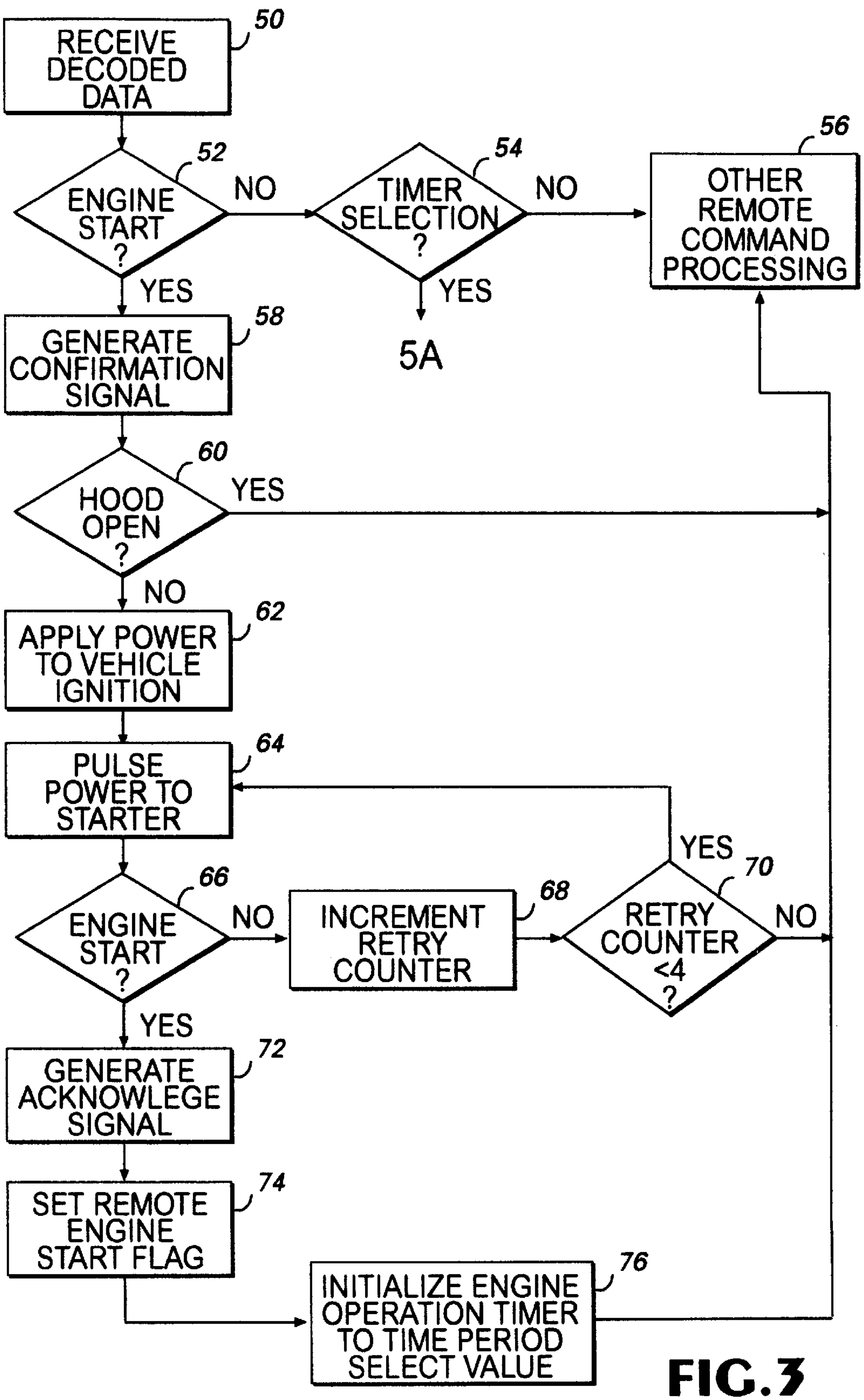
FIG. 3 is a flowchart of the processing of the starter controller performed to start the engine.
Figure 4:
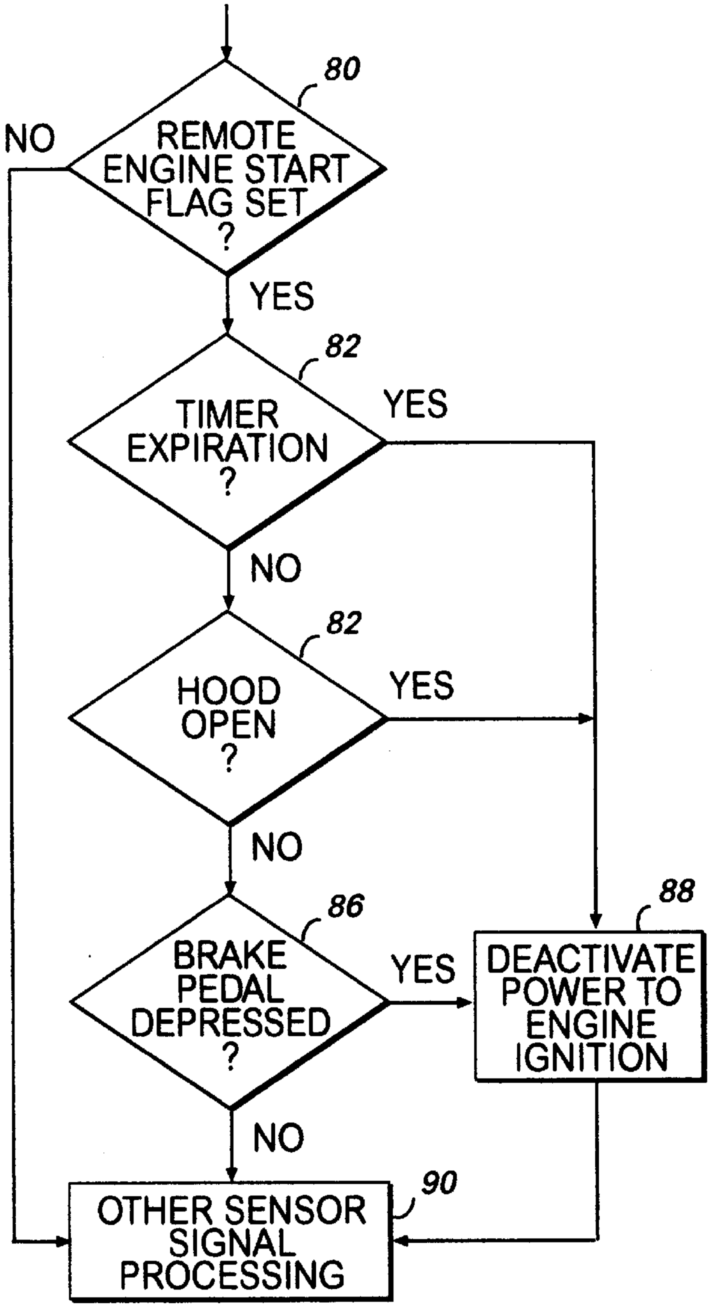
FIG. 4 is a flowchart of the processing of the starter to terminate engine operation in response to a predetermined condition occurrence.

Detailed operation of the present invention is depicted in the flowcharts of FIGS. 3 and 4. After receiver 14 has determined a received signal is from an authorized transmitter, the digital data from the signal is provided to controller 12. Controller 12 receives the decoded data (Block 50) and determines whether the signal is an ENGINE START signal (Block 52). If it is not, the command is checked to determine if it is a timer selection command (Block 54). If it is, the controller performs the processing shown in FIG. 5A. Otherwise, other remote command processing is done (Block 56). If an ENGINE START signal was received, controller 12 generates a confirmation signal to inform the user the command has been received (Block 58). Preferably, controller 12 generates the confirmation signal by pulsing power to the vehicle lighting system and most preferably the parking lights. Controller 12 then checks the signal from hood sensor 34 to determine whether the hood is open (Block 60). If it is, the engine start command is ignored. If hood sensor 34 indicates the hood is closed, controller 12 activates an internal switch which provides power to the vehicle ignition circuits (Block 62). Preferably, controller 12 pulses power to the engine starter relay (Block 64) until a signal indicating the engine has started is detected by controller 12 (Block 66). Preferably, the signal indicating the engine has started is the tachometer signal. Alternatively, controller 12 may activate the starter output for a predetermined period of time and then check a signal from sensor 30, such as DC voltage level (which increases when the engine starts and the alternator begins to charge the battery), to determine whether the engine has started (Block 66). If the engine does not start, a retry counter is incremented (Block 68) and if the counter is less than a predetermined count, which is preferably four (4), although other count values may be used, controller 12 either continues to power the starter relay or pulses power to the engine starter relay for another predetermined period of time. The period of time for pulsing the starter relay may be the same or may vary from one attempt to the next. For example, the first two attempts may be 0.75 seconds, the third attempt 1.5 seconds, and the fourth attempt 2.25 seconds (Block 70). If the engine fails to start after four times, controller 12 performs other remote command processing. If the engine starts, controller 12 sends an acknowledge signal by, for example, turning on the parking lights (Block 72). After the acknowledge signal is activated, controller 12 sets a flag which indicates a remote engine start has occurred (Block 74). Preferably, controller 12 then initializes a timer (Block 76), which may be an external hardware timer or an internal software timer. The time to which the timer is initialized may be selected by a user or it may be predetermined. After the timer is initialized, other remote command processing continues. (Block 56)

Controller 12 performs the processing shown in FIG. 4 in response to a signal from one of the sensors or the expiration of the timer. Controller 12 first determines whether the condition detected by the sensor or the expiration of the timer corresponds to a remote engine start. Controller 12 does this by determining whether the remote engine start flag is set (Block 80). If it is not, other sensor signal processing is performed (Block 90). If the flag is set, controller 12 determines whether the signal indicates timer expiration (Block 82), hood opening (Block 84), or a brake pedal depression (Block 86), although other conditions may be substituted with or added to these exemplary conditions. For example, if a thermostat is mounted in the car and coupled to controller 12, a signal indicative that a temperature set point has been reached may be used to signal engine operation should be cut off. In response to one of the predetermined conditions being detected, controller 12 deactivates power to the ignition circuits (Block 88) so engine operation ceases. Otherwise, controller 12 determines whether other sensor signal processing should be performed. (Block 90).

Figure 5A:
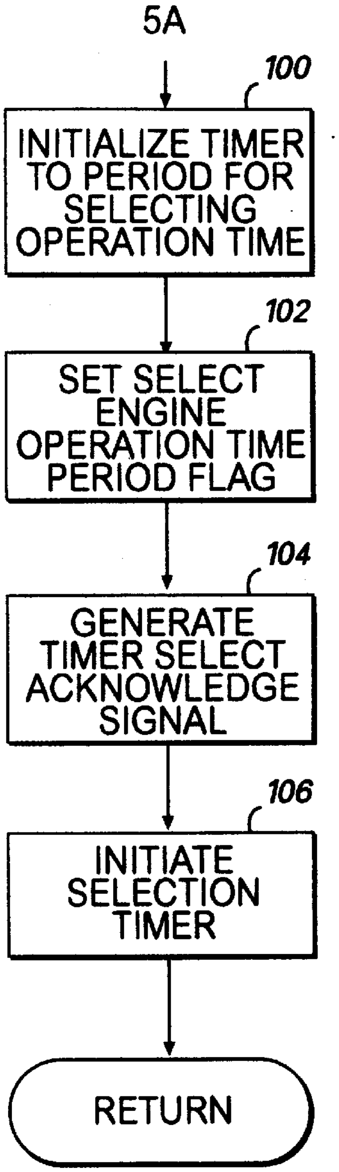
FIG. 5A is a flowchart showing controller processing in response to a select operation timer signal.
Figure 5B:
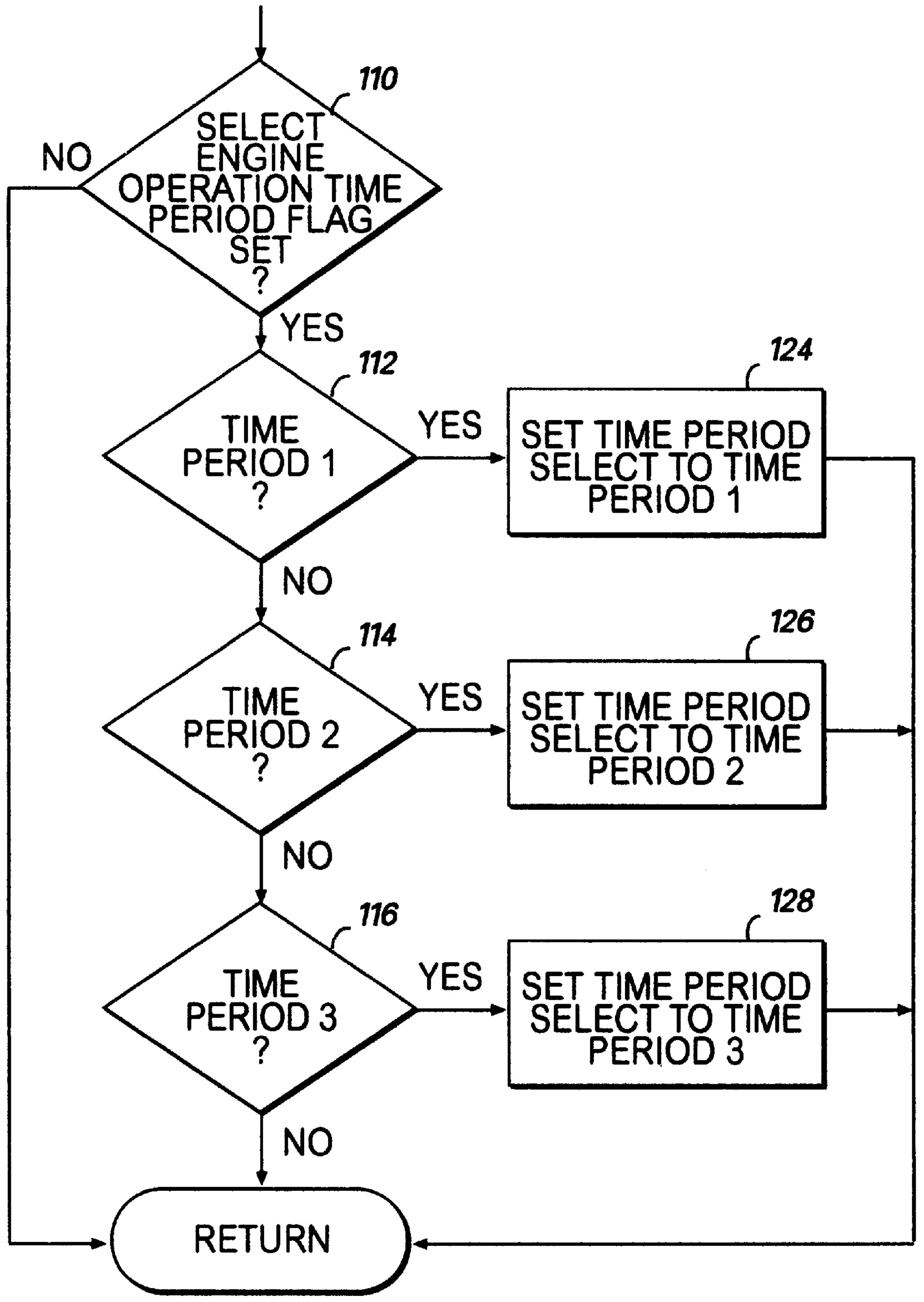
FIG. 5B is a flowchart showing a process for setting the select operation time period.
Figure 5C:
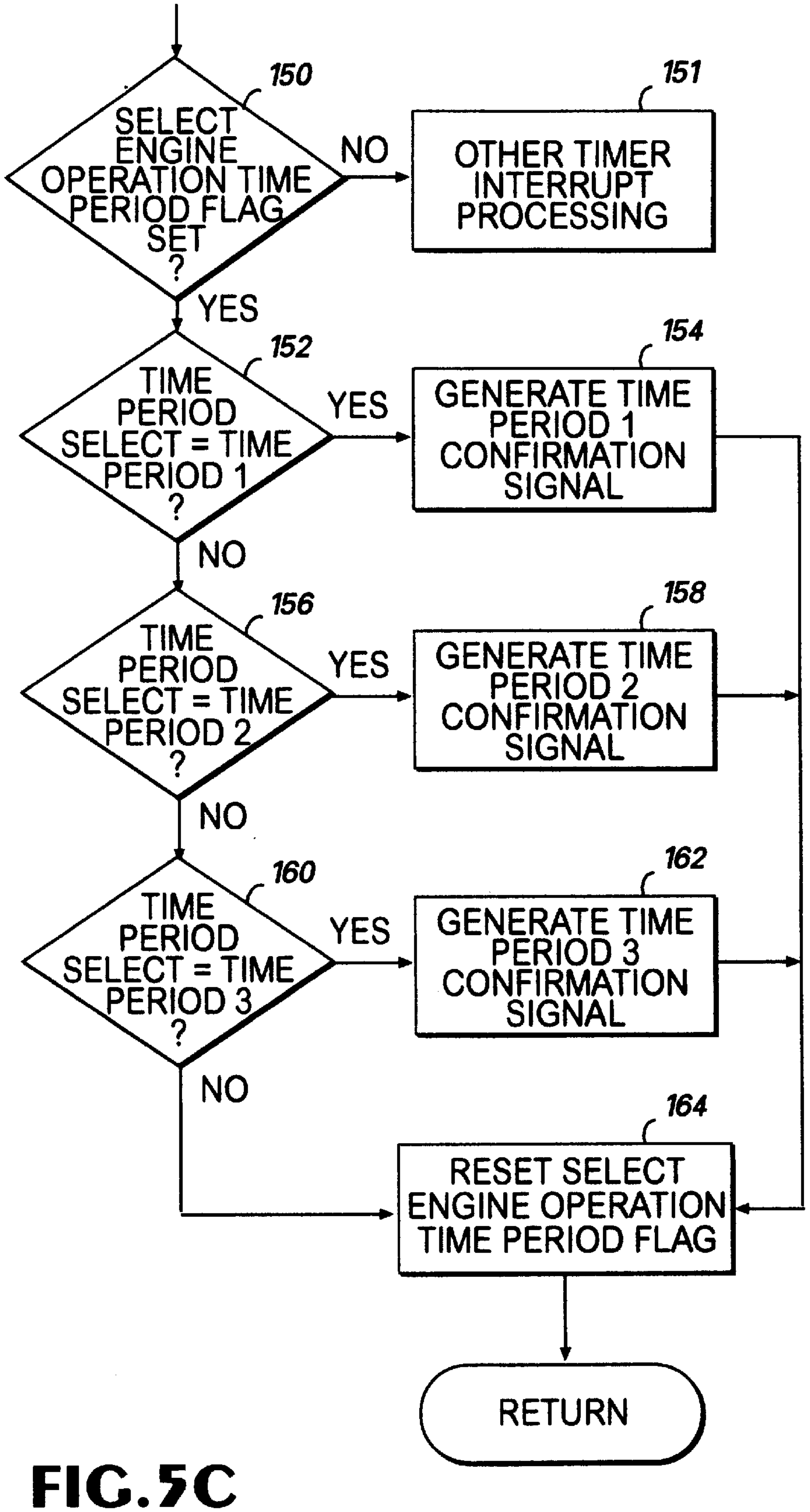
FIG. 5C is a flowchart showing controller processing in response to the selection timer expiration.

FIGS. 5A–5C are flow charts for the process which sets an engine operation time period. The processing shown in FIG. 5A is commenced in response to a timer selection signal being received from transmitter 22 (Block 54, FIG. 3). Preferably, the timer selection signal is an ENGINE START command that is continuously transmitted for a predetermined time period, such as 10 seconds. After determining that the time period for engine operation is to be selected, controller 12 initializes a timer to a period for waiting for the time period selection (Block 100), sets the select engine operation time period flag (Block 102), generates a timer acknowledge signal (Block 104), initiates the select timer (Block 106), and returns to other controller processing. Preferably, controller 12 flashes the parking lights to acknowledge receipt of the timer select command, although other signals may be used for this purpose. If that timer expires before a timer selection signal is received, the value of time period for engine operation remains unchanged.

When one of the select time period commands is received, the processing shown in FIG. 5B is performed. There, controller 12 verifies that the select engine operation time period flag is set (Block 110), and then determines whether the command selects predetermined time period 1, 2, or 3, although more or fewer time periods may be used (Blocks 112 to 116). If the decoded signal validly identifies a selected operation time, the value for initializing the timer for engine operation is identified by storing a value corresponding to the selected time period as a time period select value (Blocks 124 to 128). Processing then returns to the controller processing interrupted by receipt of the remote command.

The window for selection of a time period remains open until the selection timer expires. The processing performed when that timer expires is shown in FIG. 5C. If the select engine operation time period flag is set (Block 150), the time period select value is checked and an appropriate confirmation signal generated, if the operation time value was changed (Blocks 152 to 162). The select engine operation time period flag is then reset (Block 164) and the process returns.

Preferably, transmitter 22 has four buttons and a unique combination of the buttons are depressed to generate the timer selection signal. Preferably, three of the buttons generate timer selection value signals which correspond to five, ten, or fifteen minutes of engine operation time. Preferably, controller 12 acknowledges the operation time period selected. Most preferably, controller 12 provides this acknowledgment by flashing the parking lights once when the time period is set to five minutes, twice when the time period is set to ten minutes, and three times when the time period is set to fifteen minutes. Other confirmation signals may be provided such as chirping an alarm annunciator if one is coupled to controller 12.

Figure 6:
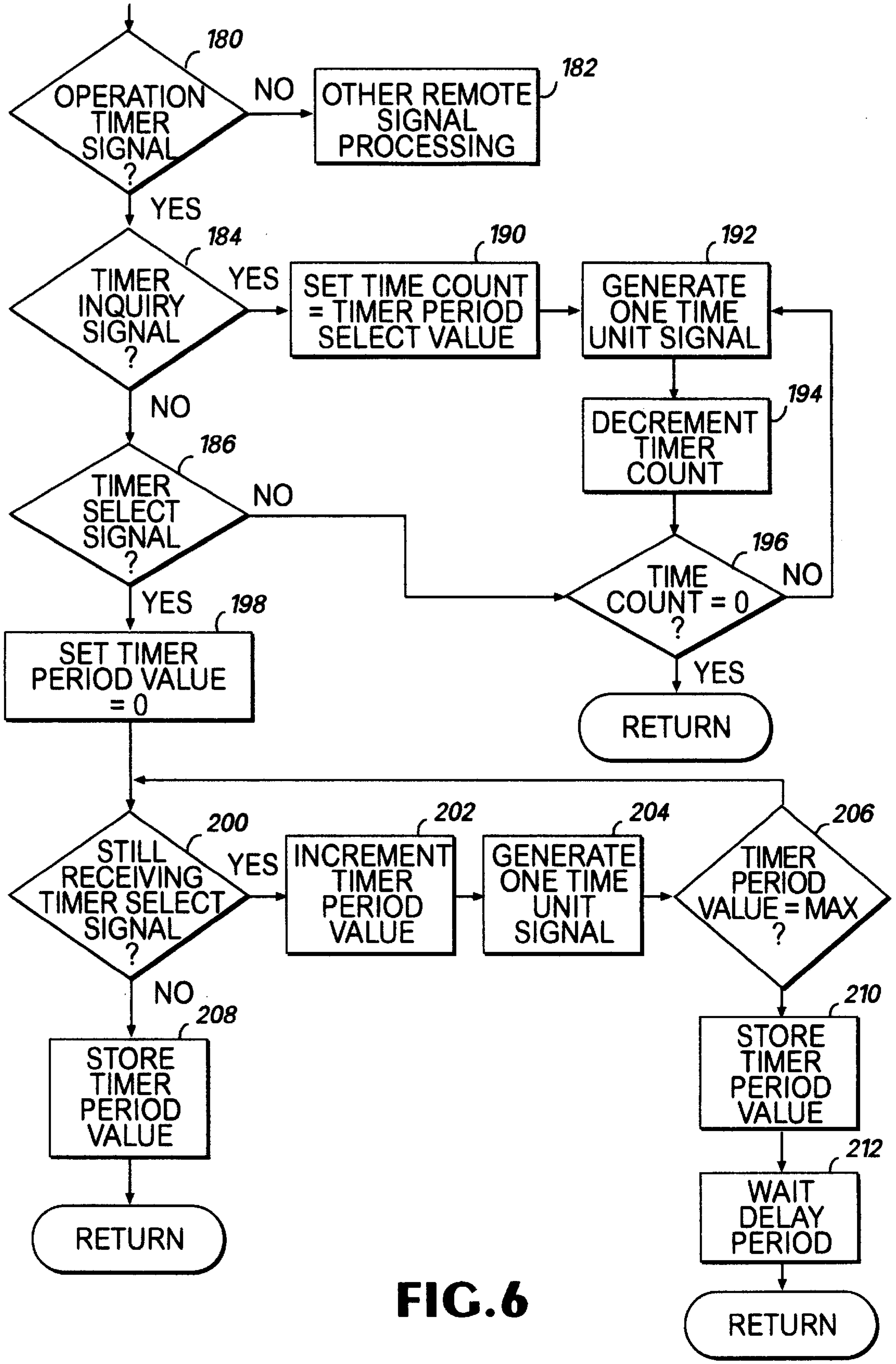
FIG. 6 is a flowchart showing an alternative process for setting the select operation time period.

An alternative method for setting the engine operation timer is shown in FIG. 6. The method begins by determining whether the wireless signal is a signal generated by the depression of the engine operation timer select button on the transmitter (Block 180). If the engine operation timer select signal is present for a first period of time and terminates, e.g., one second, the signal represents a timer inquiry signal (Block 184). In response to a timer inquiry signal, a time count is, preferably, set equal to the number of minutes represented by the timer period select value (Block 190). The process continues by generating a unit of time signal (Block 192) which preferably is a flash of the vehicle lights to represent one (1) minute of engine operation time. The time count is then decremented (Block 194) and checked to determine if the count is zero (Block 196). If it is not, the unit of time signal is generated again and the time count is decremented. In this way, the unit of time signal is generated a number of times corresponding to the number units of time that the engine operates. For example, for a ten (10) minute duration, the lights flash ten times. Once the engine operation time is provided, the process returns to the processing being performed prior to receipt of the wireless signal.

If the operation timer signal continues until it reaches a second time period, the process determines it is a timer select signal (Block 186). In response, it resets the timer period select value to zero (Block 198) and checks to see if the operation timer signal is still being received (Block 200). If it is not, the current value of the timer period value is stored (Block 208). Otherwise, the timer period value is incremented by one unit of time (Block 202), which preferably is one (1) minute, and a one unit of time signal generated (Block 204), and the timer period value checked to see if it is equal to the maximum value (Block 206). If it is not, a check for continued receipt of the timer select signal is made (Block 200). If the maximum value has been reached, that value is stored in the timer period value (Block 210) and a delay period is timed (Block 212). Processing then returns to the processing interrupted by receipt of the signal. If the user continues to hold the button on the transmitter down, the process in FIG. 6 is repeated. Preferably, the unit of time signal is one flash of the vehicle lights to represent one (1) minute of engine operation time.

The present invention encompasses implementation of timer 36 as an external device as well as its implementation internal to controller 12. Typical external timer devices receive a value corresponding to the time period to be timed from controller 12 and respond with an interrupt or other message to that controller 12 upon expiration of the time period. Internal timers implemented within the program running on controller 12 perform a similar function by decrementing or incrementing from an initial value in response to a system timer interrupt. The initial value corresponds to the time period to be timed.

In use, a user proximate to a vehicle in which a remote starter 10' is installed, depresses a transmitter key for selecting the engine operation time until controller 12 activates the timer select acknowledge signal. Within the timer selection window, the user depresses a key corresponding to one of the preselected engine operation times and controller 12 confirms selection of an engine operation time period. Thereafter, the user may depress the transmitter key which emits an ENGINE START signal to receiver 14 of starter 10'. After verifying the transmitter is authorized to operate the starter, receiver 14 provides the decoded information to controller 12 which generates a confirmation signal that the start command has been received. Controller 12 then applies power to the ignition circuits and the starter relay. If a sensor generates a signal indicative that the engine has started, controller 12 activates an engine operating signal to inform the user that the engine has started. Otherwise, controller 12 tries for a predetermined number of times to start the engine. If the engine does not start, controller 12 does not send any signals to the user.

Once the engine is running, controller 12 terminates engine operation in response to the engine operation timer expiring, the hood being opened, or the brake pedal being depressed, unless the ignition key is used to turn on the ignition switch. If the user turns on the ignition switch prior to controller 12 terminating the engine, the user may operate the vehicle as if the user had started the vehicle by using the key in the switch. If a user wants to disable operation of remote starter 10', for example, during service, the user opens the hood so controller 12 does not apply power to the ignition circuits or starter in response to an ENGINE START signal.

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art.

What is claimed is:

1. A remote vehicle starter for starting and stopping a vehicle engine comprising:

a receiver for receiving wireless signals;

a controller controller to said receiver and to vehicle ignition circuits and an engine starter, said controller applying power to said ignition circuits and said starter to start operation of said engine in response to a wireless engine start signal being received by said receiver, said controller processing said wireless signals to determine which chosen value of predetermined time duration values was selected by a user;

a timer coupled to said controller for timing a time period which corresponds to said chosen value in response to said wireless engine start signal, said timer generating a time expiration signal in response to expiration of said time period; said controllersetting said time period to a user selected value corresponding to a duration of a timer select signal received from a remote transmitter; and said controller terminating engine operation in response to the time expiration signal.

2. The remote starter of claim 1 wherein said time period is set to zero in response to receipt of said timer select signal; and said timer period is incremented by one unit of time in response to said timer select signal being detected for a continued period of time.

3. A remote vehicle starter and start indication signal for a vehicle engine, comprising:

a receiver for receiving wireless signals; and a controller coupled to said receiver and to vehicle ignition circuits and an engine starter, said controller applying power to said ignition circuits and said starter in response to a wireless engine start signal being received by said receiver, said controller determining which one of predetermined time duration values for engine termination was selected by a user, said controller generating a signal to the lights of said vehicle, said signal causing said lights to flash a number of times, said number varying depending on which of the time duration values was selected for termination of said engine.

* * * * *